(12) United States Patent
Armes

(10) Patent No.: US 11,807,385 B2
(45) Date of Patent: Nov. 7, 2023

(54) TURRETED SENSOR INSTALLATION AND REMOVAL FIXTURE

(71) Applicant: The United States of America, as represented by the Secretary of the Navy, Crane, IN (US)

(72) Inventor: Craig Michael Armes, Washington, IN (US)

(73) Assignee: The United States of America, Represented by the Secretary of the Navy, Washington, DC (US)

( * ) Notice: Subject to any disclaimer, the term of this patent is extended or adjusted under 35 U.S.C. 154(b) by 783 days.

(21) Appl. No.: 16/930,612

(22) Filed: Jul. 16, 2020

(65) Prior Publication Data

US 2021/0016885 A1 Jan. 21, 2021

Related U.S. Application Data

(60) Provisional application No. 62/874,549, filed on Jul. 16, 2019.

(51) Int. Cl.
*B64D 45/00* (2006.01)
*F16B 2/12* (2006.01)

(52) U.S. Cl.
CPC ............. *B64D 45/00* (2013.01); *F16B 2/12* (2013.01); *B64D 2045/0085* (2013.01)

(58) Field of Classification Search
CPC .. B64D 45/00; B64D 2045/0085; B64D 7/00; F16B 2/12
See application file for complete search history.

(56) References Cited

U.S. PATENT DOCUMENTS

| | | | |
|---|---|---|---|
| 2012/0025021 A1* | 2/2012 | Jorgensen | B64D 47/08 244/129.4 |
| 2021/0236042 A1* | 8/2021 | Van Gompel | A61B 5/263 |

OTHER PUBLICATIONS

Origin Acoustics AV850 amplifier installation manual, dated 2017 (Year: 2017).*
Wuhan Joho JH602-300/75 Multi-Sensor Electro-optical Infrared Tracking Camera System product information page, dated by web.archive.org: May 17, 2018 (Year: 2018).*
DVIDS article by Clifford Davis titled "fleet readiness center southeast targeting future with new turret maintenance capability" dated Feb. 27, 2019 (Year: 2019).*

* cited by examiner

*Primary Examiner* — Terrell L McKinnon
*Assistant Examiner* — Ding Y Tan
(74) *Attorney, Agent, or Firm* — Naval Surface Warfare Center, Crane Division; Eric VanWiltenberg

(57) ABSTRACT

The present invention relates to a turreted electro-optic sensor installation and removal fixture. the base with integral cushion supports the sensor vertically and is the interface between the turreted electro-optic sensor installation and removal fixture and an agnostic lift device. The support arms with integral cushions secure the sensor horizontally and minimize any swaying movement of the sensor. The quick disconnect pins lock the support arms to the base.

7 Claims, 4 Drawing Sheets

TURRETED SENSOR INSTALLATION AND REMOVAL FIXTURE

CROSS-REFERENCE TO RELATED APPLICATIONS

This application claims priority to U.S. Provisional Application Ser. No. 62/874,549 filed on Jul. 16, 2019 the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,594) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to a sensor installation and removal fixture.

BACKGROUND AND SUMMARY OF THE INVENTION

The present invention relates to fixtures for installing and removing sensors within tight geometry constraints. Sensors may need to be installed in locations that do not provide easy access to the sensor. These locations may have inherent obstructions that prevent users to use installation aides or require difficult maintenance actions. Turreted electro-optical sensors are typically installed and removed with a specific fixture/interface device and a means to lift/lower the fixture to the required height above ground level. While the lift device can be agnostic, the fixture that interfaces with the sensor is specific to the geometry and mounting configuration provided by the sensor manufacturer. The fixture/interface device typically secures sensors via fasteners or mechanical clamping features or straps while the fasteners attaching the sensor to the aircraft are installed/removed. A typical installation/removal fixture is limited by the location of the mounting fasteners or securing mechanisms relative to the aircraft geometry. Fixture mounting provisions are typically provided on the cylindrical sides of the sensor in locations that interfere with aircraft structure and fairings when installing/removing the sensor. Clearances between the sensor and the aircraft are small and can lead to damage to the sensor and/or aircraft when the lifting/lowering device is operated. Pinch points can be created for the maintainers if they are required to have hands in these tight spaces during the installation/removal process in order to reach the fasteners that mount the sensor. Clamping/strapping mechanisms are also cumbersome because of the tight geometries. They may also be overtightened, damaging the sensor structure. Specific fixture/interface devices often require the removal of their fasteners and clamps during the final phase of sensor installation or first phase of sensor removal in order to clear the aircraft structure. This leaves the sensor vulnerable to dislodging and susceptible to damage.

The Turreted Electro-Optic Sensor Installation and Removal Fixture overcomes the limitations of a traditional fixture/interface device by removing the need to use the sensor specific interface fasteners or clamping features. This in turn allows the reduction in the size of the fixture/interface device, allowing for easier sensor installation/removal in tight areas around the aircraft structure and mechanisms and reduced risk due to damage. The Turreted Electro-Optic Sensor Installation and Removal Fixture eliminates the need for tools to mount the sensor to the fixture/interface device. The incorporation of quick pins, sliding clamping components, and padded surfaces reduces maintenance actions and damage potential to the sensor. The quick pins and sliding clamps are located in such manner as to reduce the number of pinch points and risks to maintainers.

The purpose of the Turreted Electro-Optic Sensor Installation and Removal Fixture is to provide a means to install and remove electro-optic sensors on objects with cumbersome geometries that would not permit large installation aides and would require difficult maintenance actions to install/remove a sensor. Aircraft mounting locations may include external mounts to the main fuselage structure such as a hard-mounted interface or an external store. Locations may also include mounts internal to the aircraft fuselage structure such as those utilizing a mechanically actuated elevator. The design of the Turreted Electro-Optic Sensor Installation and Removal Fixture allows for the sensor to be removed without sensor specific mounting components within the tight geometry constraints from the resultant failure mode of the aircraft equipment.

According to an illustrative embodiment of the present disclosure, design and geometry features that allow for the installation of a sensor on aircraft with limited space for maneuvering the sensor and support equipment. The support arms are narrow concentrically around the perimeter of the sensor. This allows for relatively small clearances between a sensor and an aircraft's mounting structure, fairing, or mechanisms. The pads on the support arms that engage the base clips have a small profile, requiring a limited range of motion to engage a sensor. Again, this reduces the required space claim relative to a typical fixture/interface device, making sensor installation/removal easier for a maintainer.

According to a further illustrative embodiment of the present disclosure, the fixture is agnostic to specific manufacturer's electro-optic sensors. The use of cushions on both the base and the support arms to secure the sensor precludes the use of sensor specific mounting features. As long as a particular manufactures sensor falls within the geometric envelop of the Turreted Electro-Optic Sensor Installation and Removal Fixture, it can be installed/removed without the use or sensor specific mounting features or hardware, which may or not be proprietary. No additional tooling such as sockets, wrenches, screwdrivers, etc. are required to secure and install/remove a sensor other than those mounting the sensor to the aircraft. The support arms are fully engaged via the quick disconnect pins, so if the pins are properly installed, the sensor is secure without the use of the above mentioned tools.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
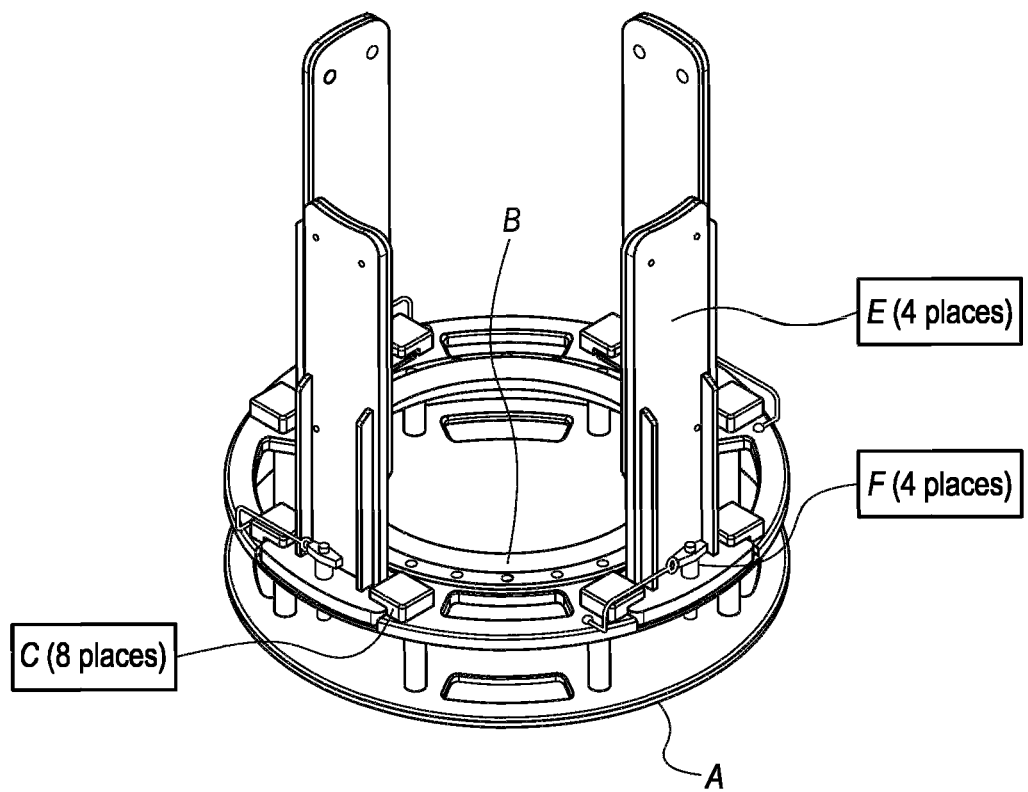
FIG. 1 shows an exemplary turreted sensor fixture.

FIG. 1 shows an exemplary turreted sensor fixture. The Turreted Electro-Optic Sensor Installation and Removal Fixture is comprised of the following primary components: base A with integral cushion B, eight clips C, and four pads (not shown); four support arms with integral cushions E; four quick disconnect pins F with integral lanyards. The base with integral cushion supports the sensor vertically and is the interface between the Turreted Electro-Optic Sensor Installation and Removal Fixture and an agnostic lift device. The support arms with integral cushions secure the sensor horizontally and minimize any swaying movement of the sensor. The quick disconnect pins lock the support arms to the base.

Figure 2:
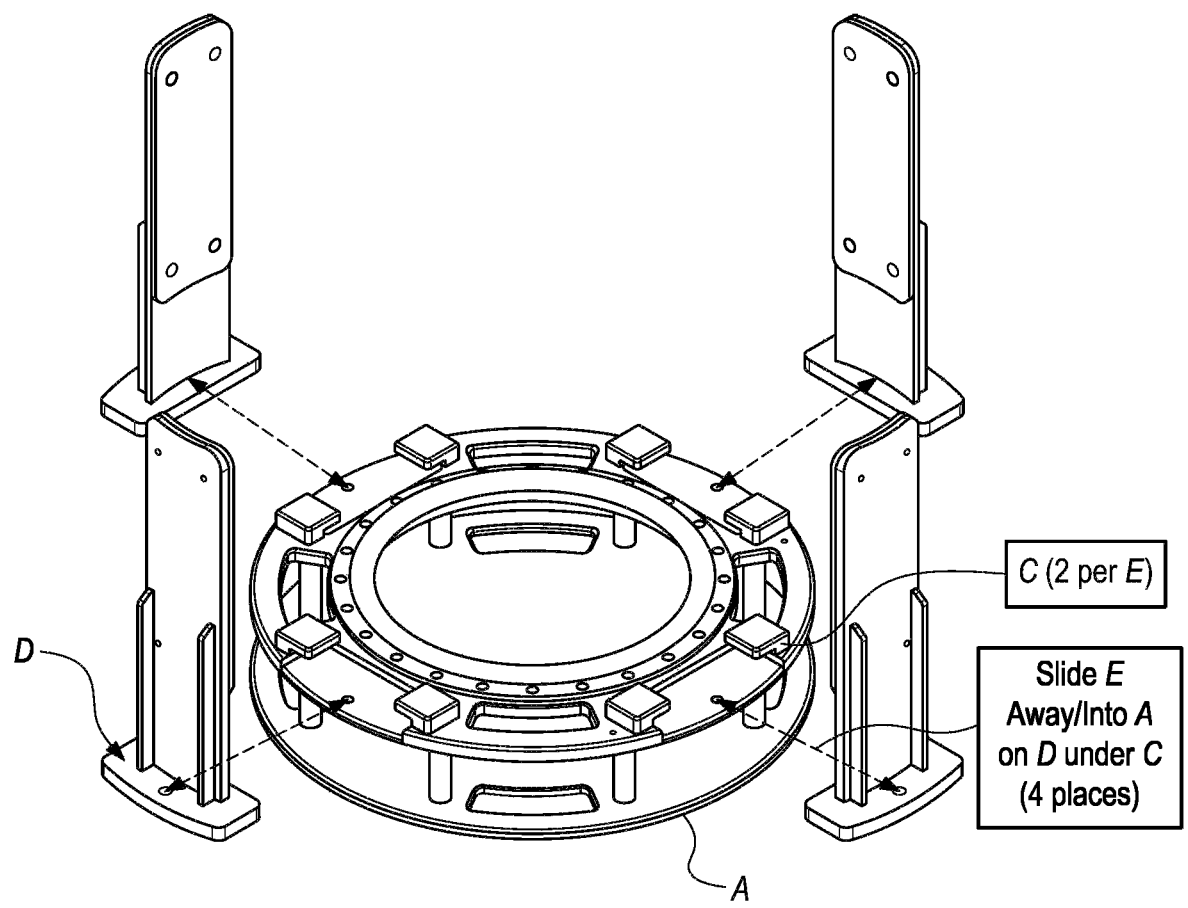
FIG. 2 shows an exemplary sensor fixture with pins removed from base.

FIG. 2 shows an exemplary sensor fixture with pins F removed from base A. The operation to remove a sensor from an aircraft will be detailed as follows. (Sensor installation is the same procedure in reverse order and will not be detailed.) In order to remove a sensor G, disengage and pull the quick disconnect pins F from the base A. The quick disconnect pins are retained via the integral lanyards attached to the base. Slide the support arms E away from the center of the base A and remove. FIG. 2 displays the installation and removal of the support arms. The quick disconnect pins are not shown. Position the base A via the lift device underneath the sensor G. Raise the base A via the lift device until the base cushion B is centered and firmly engaged with the sensor G. Once the sensor G and base cushion B are engaged, slide the support arms E into the clips C (2 per arm) on the base pads D as shown in FIG. 2. Install the quick disconnect pins F in corresponding holes in the support arms and base A.

Figure 3:
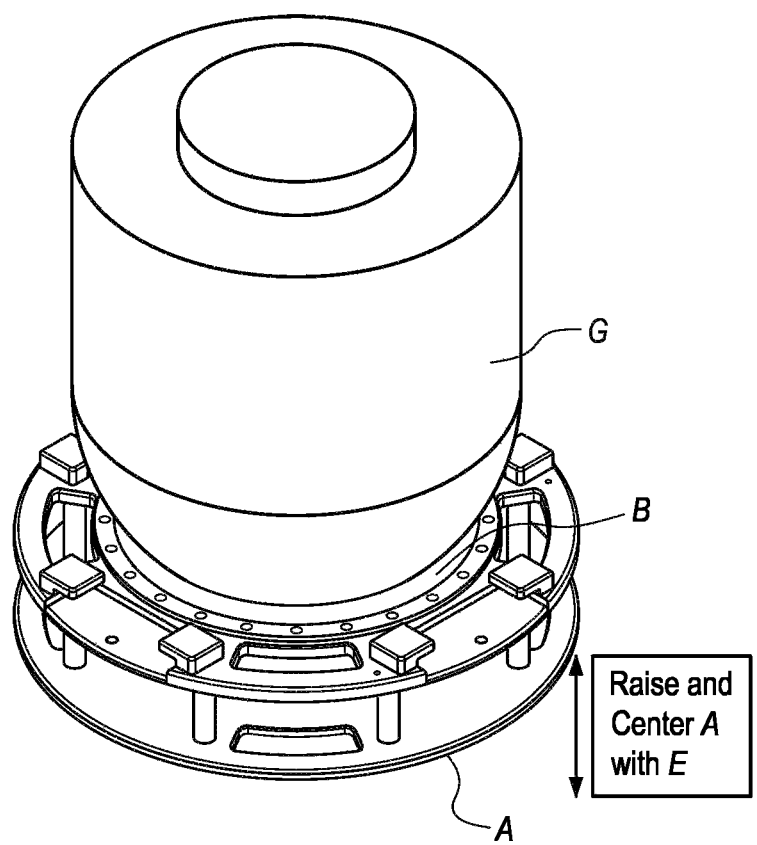
FIG. 3 shows an exemplary sensor fixture cushion engaged with a sensor.

FIG. 3 shows an exemplary sensor fixture cushion engaged with a sensor G. FIG. 3 displays the engagement between the sensor and cushion. In this figure the support arms and quick disconnect pins are uninstalled as described and not shown. The lift device is also not shown.

Figure 4:
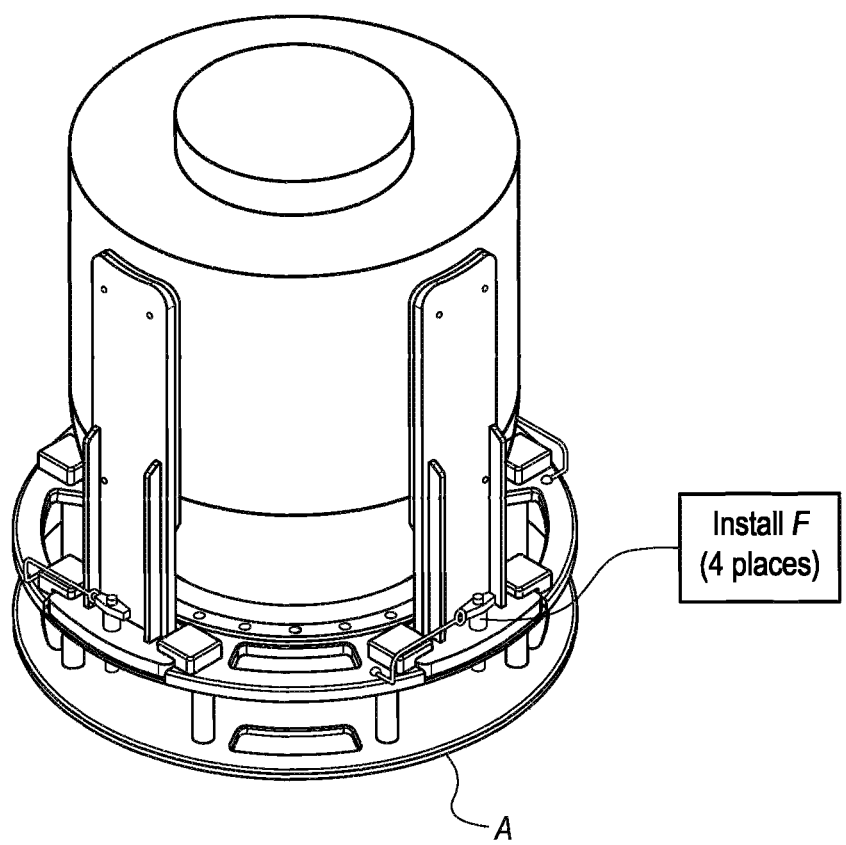
FIG. 4 shows an exemplary sensor fixture engaged with a sensor.

FIG. 4 shows an exemplary sensor fixture engaged with a sensor G. FIG. 4 displays the support arms and quick disconnect pins in their installed positions with the sensor in place. This action may include inserting portions of the support arms into aircraft fairing or mechanisms.

The Turreted Electro-Optic Sensor Installation and Removal Fixture possesses design and geometry features that allow for the installation of a sensor on aircraft with limited space for maneuvering the sensor and support equipment. The support arms are narrow concentrically around the perimeter of the sensor. This allows for relatively small clearances between a sensor and an aircraft's mounting structure, fairing, or mechanisms. The pads on the support arms that engage the base clips have a small profile, requiring a limited range of motion to engage a sensor. Again, this reduces the required space claim relative to a typical fixture/interface device, making sensor installation/removal easier for a maintainer.

The Turreted Electro-Optic Sensor Installation and Removal Fixture allows for reduced risk to maintainers and by eliminating pinch points. The design and geometry features of the Turreted Electro-Optic Sensor Installation and Removal Fixture allows for the installation and removal of a sensor without the need to directly fasten the sensor to a fixture/interface device. Due to this design, maintainers are not required to place hands on the sides or top of the sensor in order to engage locking features of a fixture/interface device, reducing the number of actions where a maintainer could place hands between structures and equipment that could lead to an injury.

The Turreted Electro-Optic Sensor Installation and Removal Fixture provides a means to maintain a secure hold on a sensor during the final phase of sensor installation or first phase of sensor removal that requires the removal of sensor fasteners without the need of additional fasteners. The design and geometry features allow the sensor to be firmly held without using any fasteners to secure it to the fixture. This keeps the sensor from being vulnerable to dislodgement and damage during the final installation and initial removal phase of maintenance.

The Turreted Electro-Optic Sensor Installation and Removal Fixture can be adapted to a variety of electro-optic sensors varying in size and shape. The separation distance between the support arms and the diameter of the base cushion could be adjusted to cradle sensors of differing diameters and form factors. In conjunction with varying the separation distance, the height of the support arms could be adjusted to accommodate sensors of varying heights. A further feature that allows for the rotation of the base cushion could be incorporated into the base to allow for fine rotational adjustment of a sensor when aligning it to the aircraft mounting provisions. This feature has been incorporated into other sensor installation and removal features designed by the author of the disclosure.

Although the invention has been described in detail with reference to certain preferred embodiments, variations and modifications exist within the spirit and scope of the invention as described and defined in the following claims.

The invention claimed is:

1. A turreted fixture comprising:
   a base comprising a plurality of clips and a base cushion, wherein the base is formed with a plurality of base retention apertures;
   a plurality of support arms, wherein each support arm comprises a pad, wherein each support arm is formed with an arm retention aperture;
   a plurality of pins;
   wherein each support arm is adapted to engage with the base by sliding horizontally into the base such that each pad is disposed above an upper surface of the base and below two clips of the plurality of clips;
   wherein each pin is adapted to pass through a corresponding base retention aperture and arm retention aperture to hold a corresponding support arm of the plurality of support arms in place.

2. The fixture of claim 1, wherein each pin further comprises a lanyard, wherein each lanyard is coupled to the base.

3. The fixture of claim 1, further comprising:
   a sensor, wherein the base cushion is coupled to the sensor with friction, wherein the plurality of support arms are adapted to hold the sensor when the plurality of support arms are engaged with the base.

4. The fixture of claim 1, wherein each support arm is coupled to a device such that the turreted fixture hangs below the device.

5. The fixture of claim 4, wherein the device is an aircraft.

6. The fixture of claim 3, wherein the sensor is coupled to a device such that the turreted fixture hangs below the device.

7. The fixture of claim 6, wherein the device is an aircraft.

\* \* \* \* \*